United States Patent [19]
Hellings

[11] Patent Number: 5,467,998
[45] Date of Patent: Nov. 21, 1995

[54] NON-TOXIC, EDIBLE, AND BIODEGRADABLE SKEET AND METHOD OF MAKING THE SAME

[76] Inventor: Deborah Hellings, P.O. Box 37247, Tallahassee, Fla. 32315

[21] Appl. No.: 283,539

[22] Filed: Aug. 1, 1994

[51] Int. Cl.⁶ .................... F41J 9/16; A01K 5/00
[52] U.S. Cl. .............. 273/363; 119/51.01; 119/51.03; 293/380; 426/805
[58] Field of Search .................. 273/363, 380, 273/362, 58 R, 418; 119/51.03, 57.8; 426/805

[56] References Cited

U.S. PATENT DOCUMENTS

| | | | |
|---|---|---|---|
| 1,791,175 | 2/1931 | Tomlinson | 119/51.03 |
| 3,094,100 | 6/1963 | Wise | 119/51.03 |
| 3,122,129 | 2/1964 | Wise | 119/51.03 |
| 4,023,150 | 11/1976 | Moehlman et al. | 273/362 |
| 4,124,550 | 11/1978 | Kobayash et al. | 273/362 X |
| 4,921,250 | 5/1990 | Ayres | 273/58 R |
| 5,009,165 | 4/1991 | Morris | 273/418 X |
| 5,033,708 | 7/1991 | Brue et al. | 119/57.8 |
| 5,034,227 | 7/1991 | Nickel | 426/634 X |
| 5,108,677 | 4/1992 | Ayres | 264/112 |
| 5,174,581 | 12/1992 | Goodson | 273/363 |
| 5,316,313 | 5/1994 | Moore | 273/363 |
| 5,317,119 | 5/1994 | Ayres | 264/112 X |

*Primary Examiner*—William H. Grieb
*Attorney, Agent, or Firm*—Carnes, Cona, and Dixon

[57] ABSTRACT

The present invention provides for an environmentally safe composition of a non-toxic, edible, biodegradable skeet that is used for trap shooting. The skeet of the present invention is designed in such a way that it can be stackable as well as being able to withstand the throwing force of the trap. The skeet is fabricated from a mixture of flour, water, and another edible granular element, such as birdseed. This substance is placed in a mold and is baked to harden. The resulting skeet is one which is easily breakable by a shotgun blasts as well as strong enough to withstand the throwing force of the trap. The design and shape of the skeet of the present invention is such that it possesses an aerodynamic structure which permits the target (skeet) to be projected with considerable speed into the air by the trap.

3 Claims, 1 Drawing Sheet

5,467,998

NON-TOXIC, EDIBLE, AND BIODEGRADABLE SKEET AND METHOD OF MAKING THE SAME

BACKGROUND OF THE INVENTION

1. Field of the Invention

The present invention relates to improvements in the composition of skeets used in traps or skeet shootings and more particularly the present invention relates to a composition which is completely biodegradable, edible, as well as being non-toxic.

2. Description of the Prior Art

A number of attempts have been made to produce a non-toxic skeet/clay pigeon. Most of these pigeons are designed to change the composition of the toxic clay pigeon in order to reduce or eliminate the toxic component of the clay pigeon. U.S. Pat. No. 5,174,581, however, provides a novel approach to the toxic problem by producing a non-toxic, edible, and non-clay pigeon that is biodegradable. The invention disclosed in U.S. Pat. No. 5,174,581 includes a clay pigeon which is fabricated from a composition of mainly sugar and bird seed. Though the results were satisfactory, the clay pigeons were costly, not as durable, and limited in ingredients.

None of the previous efforts, however, provide the benefits intended with the present invention. Additionally, prior techniques do not suggest the present inventive combination of component ingredients and method of preparation as disclosed and claimed herein. The present invention achieves its intended purposes, objectives and advantages over the prior art device through a new, useful and unobvious combination of component ingredients, which are simple to make and use, with the utilization of a minimum number of functioning ingredients, at a reasonable cost to manufacture, prepare, test and by employing only readily available ingredients.

SUMMARY OF THE INVENTION

The present invention provides for a composition of a non-toxic edible flour biodegradable skeet for skeet and trap shooting.

The elements used to fabricate the non-toxic edible biodegradable skeet of the present invention consist of flour, water, and non-water soluble edible substances, such as bird seed. An edible and biodegradable polymer can be utilized as a filler.

The present invention is so constructed and designed to provide for the edible skeet to be generally fabricated in a saucer shape. This shape will enable the clay pigeon to be placed on a conventionally mechanical disk throwing apparatus, known as a trap. The unique ingredients used to formulate the present invention produces a skeet that is easily breakable by a shotgun blast as well as being strong enough to withstand the force of the mechanical disk throwing apparatus. The combination of the shape and the composition provides for a clay pigeon that has an aerodynamic structure.

Accordingly, it is an object of the present invention to provide a non-toxic skeet that possess all the qualities of a clay pigeon, but will not harm the environment.

It is another object of the present invention to provide for a non-toxic skeet that is formed from edible materials to enable its consumption by a plurality of animals.

It is yet another object of the present invention to provide for a non-toxic skeet that is biodegradable, inexpensive to fabricate, durable when released from the disk throwing apparatus, and breakable once contact has been made with a bullet.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent structures do not depart from the spirit and scope of the invention as set forth in the appended claims.

BRIEF DESCRIPTION OF THE PREFERRED EMBODIMENTS

DESCRIPTION OF THE PREFERRED EMBODIMENTS

Figure 1:
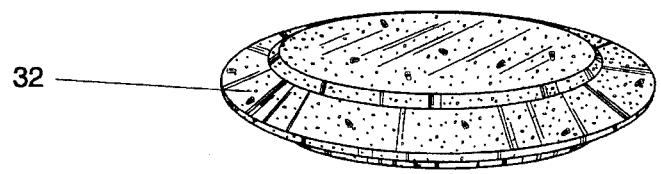
FIG. 1 is a perspective view of a disc shape skeet of the present invention.
Figure 2:
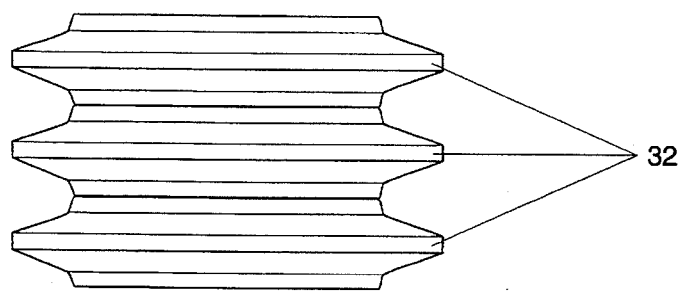
FIG. 2 is a perspective view of a stack of skeets of the present invention.
Figure 3:
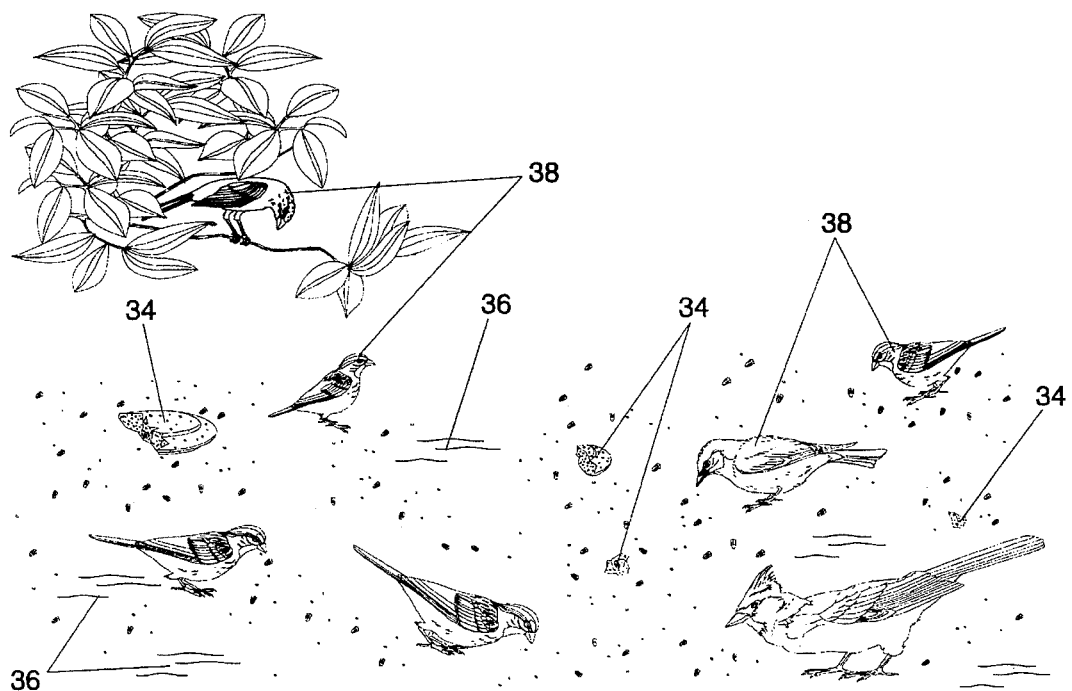
FIG. 3 is an environmental perspective view of the instant invention after being hit by a marksman, being eaten by local birds.

The present invention, illustrated in FIGS. 1–3, is drawn to the composition of a non-toxic, edible, flour biodegradable skeet 32 that is used for trap shooting. The skeet 32 of the present invention has a saucer-like shape (see FIG. 1), the same as what is used with conventional skeets.

The present invention uniquely combines edible ingredients or elements to produce a skeet 32 that is non-toxic and biodegradable. The combination of the ingredients produces a skeet that retains its aerodynamic structure as well as being beneficial to the environment.

The elements used to fabricate the non-toxic, edible, biodegradable skeet of the present invention consist of flour, water, and non-water soluble edible substances, such as bird seeds. An edible and biodegradable polymer can be utilized as a filler.

The first step involved in forming the non-toxic edible biodegradable skeet of the present invention is to mix one part flour with two parts of a non-water soluble edible substance.

Examples of non-water soluble edible substances can include, but not be limited to; bird seed (millet, milo sorghum, sun flower seed, or combination thereof), corn (whole, cracked, meal), grain (wheat, barley, oats), rice (brown, white), grass (rye), wood (cypress mulch, pine, cedar), or a combination thereof.

Water is added to the mixture to provide for a paste-like substance which has a viscosity similar to cooked oatmeal.

The mixture is then placed in a skeet mold and the substance is then treated by heat (or cooked).

The heating or cooking process includes baking the mixture at a medium to high temperature (approximately 325–400 degrees C.). Baking will permit for heat to be applied at a constant rate. The heat will enable for the substance to harden. After the mixture has been cooked and hardened, it is cooled and removed from the mold.

These skeets 32 are shaped to be stacked and transported while retaining their structural integrity (see FIG. 2). The combination of the ingredients enables the skeets to withstand the throwing force of the trap mechanism, while maintaining its aerodynamic structure. Additionally, the skeets 32 are also designed and constructed to shatter into fragments 34 when hit by a marksman, thus satisfying the victory condition for the sport of skeet shooting.

Once shattered, the edible pieces (such as birdseed 36) of the skeet can be consumed by the local animals 38.

While the invention has been particularly shown and described with reference to an embodiment thereof, it will be understood by those skilled in the art that various changes in form and detail may be made without departing from the spirit and scope of the invention.

I claim:

1. A biodegradable fragile flying target comprising:

a baked compound of edible material;
      said baked compound consists of flour, a granular edible element, and water;
         said edible element is twice the volume of the volume of said flour;
            said edible element is selected from the group consisting of birdseed, corn, grain, rice, grass, and wood; and
      said flying target having an aerodynamic structure and constructed to retain its integral configuration when thrown by a trap mechanism and is easily breakable by a shotgun blast.

2. A biodegradable fragile flying target comprising:

a baked compound of edible material;
      said baked compound consists of flour, at least two granular edible elements, and water;
         said edible elements are twice the volume of the volume of said flour;
            said edible elements are selected from the group consisting of birdseed, corn, grain, rice, grass, and wood; and
      said flying target having an aerodynamic structure and constructed to retain its integral configuration when thrown by a trap mechanism and is easily breakable by a shotgun blast.

3. A method of making a biodegradable flying target comprising the steps of:

mixing flour and at least one granular edible element
      said edible element is twice the volume of the volume of said flour;
         said edible element is selected from the group consisting of birdseed, corn, grain, rice, grass, and wood;

adding water to said flour and said granular edible element to form a pasty mixture;

placing said pasty mixture in a skeet mold;

baking said pasty mixture to harden said pasty mixture;

removing said mold to produce said biodegradable flying target; and said flying target having an aerodynamic structure and constructed to retain its integral configuration when thrown by a trap mechanism and is easily breakable by a shotgun blast.

* * * * *